United States Patent [19]

Emery

[11] 3,717,250

[45] Feb. 20, 1973

[54] COLOR CODED COMPUTER SYSTEM

[75] Inventor: Douglas M. Emery, Bakersfield, Calif.

[73] Assignee: Ambrite Computer Rents, Inc., Visalia, Calif.

[22] Filed: Aug. 2, 1971

[21] Appl. No.: 168,001

[52] U.S. Cl. ....209/111.6

[51] Int. Cl. ....B07c 5/342

[58] Field of Search.....209/111.5, 111.6, 111.7, 122; 235/61.7; 340/172.5; 270/58; 234/2; 29/33

[56] References Cited

UNITED STATES PATENTS 3,066,798 12/1962 Toolmin....209/111.6

3,262,696 7/1966 Zuercher....270/58

*Primary Examiner*—Allen N. Knowles

*Assistant Examiner*—Gene A. Church

*Attorney*—Gregg, Hendricson & Caplan

[57] ABSTRACT

Color coded computer cards are employed for visual identification of different types of information as may be employed in computer operations for such as bookkeeping activities. The system provides for immediate visual identification of different types of information by an operator so that mechanical operations of sorting and card handling may be visually checked to correct errors at the time of commission.

8 Claims, 8 Drawing Figures

INVENTOR.
DOUGLAS M. EMERY
BY
Gregg, Henderson & Caplan
ATTORNEYS

INVENTOR.
DOUGLAS M. EMERY
BY
Gregg, Hendricson & Caplan
ATTORNEYS

INVENTOR.
DOUGLAS M. EMERY
BY
Gregg, Henderson & Caplan
ATTORNEYS

COLOR CODED COMPUTER SYSTEM

BACKGROUND OF INVENTION

The use of computers to perform calculations, tabulations, sorting, grouping, summarizing and other operations, has become widespread. In many fields the mass of information available in rough form as upon source documents is so great as to pose serious problems of handling same. The general field of bookkeeping, for example, is in good part comprised of tedious calculations and groupings of information into usable form. The use of computers to perform many of these tedious and time-consuming tasks in this field has become conventional.

The capabilities and utilization of computers are known to those skilled in the art. However, it is briefly noted herein that a computer operates in accordance with a program applied thereto for carrying out predetermined operations upon and with data supplied to the computer. This data may be supplied in a variety of ways but is commonly provided on punched cards. Information or data from source documents is applied to computer cards by punching holes therein or placing marks thereon in coded array for retrieval by a card reader. In the operation of a computer these cards are then sorted, usually many times, into different groups and sequences for use by the computer.

In the operation of a computer or computer center, it is necessary for one trained as a computer operator to follow a certain order of operations for a particular job, including multiple handling of punched cards. Any error in such handling or sorting of cards will cause the computer to produce an erroneous result so that a "re-run" is necessary. The operator normally has no way of knowing that an error has been committed until a run is completed and the result of the computer operation printed. It has been estimated that in many computer centers time and cost of re-runs approach or even equal the time and cost of successful runs; so much that they may very materially increase the expenses involved in computer operation.

In the multiple sorting operations required for computer runs, the operator follows a set of instructions oftentimes including many steps prior to the actual processing by the computer. Normally the operator has no way of checking these individual steps as to whether or not any possible error may have been committed therein. Thus a complete sequence of steps would normally be completed before it was determined that any error occurred and this would then require a complete recycling of the steps, possibly even resulting in the same error again occurring. This incapability of an operator to identify errors in multiple sorting operations is in part the result of the apparent identity of computer cards or at least the extreme similarity thereof such that casual viewing of cards, particularly in stacks, reveals little or no information to the operator.

The present invention provides an improved method of computer operation providing a computer operator with the capability of identifying improperly located computer cards in stacks thereof at successive stages of sorting to thereby immediately locate and identify the source of errors in card placement.

SUMMARY OF INVENTION

The present invention provides color coded computer cards which are otherwise identical and which are consequently all handled and operated upon by sorting, reading and computing equipment in the same manner as conventional computer cards. Although the majority of card readers are not color sensitive, the color coding of computer cards in accordance herewith does provide a visual indication to an operator of most, if not all, improper sorting of cards in computer operations.

Information applied to punched cards may originate from a variety of different types of source documents each having different types of information thereon. The present invention provides for entering or punching information from different types of source documents on different colored computer cards. Subsequent multiple sorting steps of computer cards in accordance with the present invention then provides stacks of cards for various processes wherein different colored cards are arranged in predetermined order as, for example, a repeating sequence of red, white and blue. Intermediate sorting steps may provide all cards of the same color in the same stack.

While it is apparent that an operator may readily determine the presence of a white card in a stack of blue cards as a sorting error, it has also been discovered that an operator can readily identify the presence or absence of a colored card in a sequence of colored cards. This then provides the computer operator with the capability of detecting errors in card arrangement during card sorting operations. Such errors may occur by virtue of improperly punched cards, damaged cards, or operator error in the manner of sorting. Regardless of the source of error, the operator is herein provided with the capability of detecting the presence of the error rather than relying upon the computer itself to identify an error in an overall operation, or possibly even to print out incorrect results. A color sequence chart is provided an operator so that he can visually verify the proper sequence of cards in a sorted card deck.

The present invention furthermore provides for checking upon the sorting or arrangement of a large plurality of computer cards by color sensing techniques. Entirely aside from the data or information punched on computer cards, it is provided herein that visual cards sequence checking shall be accomplished by the provision of color coded cards and color sequence identification.

DESCRIPTION OF FIGURES

The present invention is illustrated in the accompanying drawings wherein.

DESCRIPTION OF PREFERRED EMBODIMENT

Figure 1:
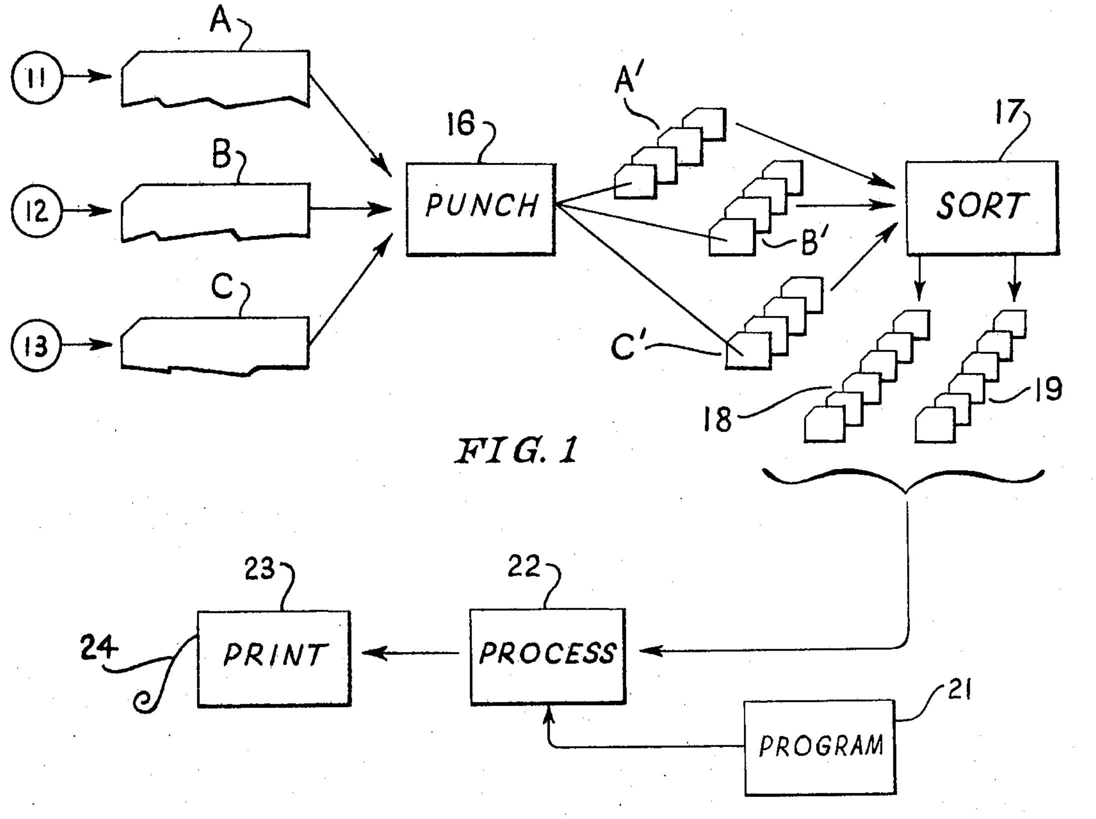
FIG. 1 is a schematic illustration of steps in the computer processing of information.

In data processing the information to be processed may be derived from a variety of sources. In FIG. 1 there is illustrated several locations 11, 12 and 13 at which basic data may be generated. With regard to some type of business enterprise, for example, one location 11 may be a sales counter generating sales slips A whereon there is recorded the item number and quantity of items sold. Another location 12 may, for example, comprise the purchasing department of the organization completing order forms B wherein there are identified items purchased and the quantity thereof. The last location 13 may, for example, comprise the accounting department wherein there is recorded at C an inventory of items in stock. It will, of course, be appreciated that the inventory information may be recorded on cards; however, for this example, it is considered that the inventory information is at least originally provided in written form.

The information upon the source documents A, B and C is recorded upon computer cards 14 as by means of a data recorder or keypunch 16. The keypunch 16 produces a stack of cards A′ containing the data of the source documents A. Similarly the keypunch is employed to produce punched cards B′ and C′ from the information on source documents B and C.

Further operations in the processing of data are indicated in FIG. 1 as including sorting 17 wherein the cards are arranged or sorted into some desired order in card decks 18 and 19, for example. These data cards of decks 18 and 19 are then operated upon in accordance with some instructions or program 21 by processing 22 to produce results that may be printed 23 to produce an output record 24.

Figure 2A:
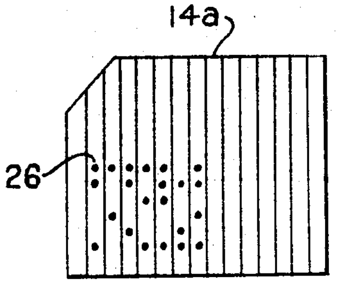
FIGS. 2A, 2B, and 2C are an illustration of color coded computer cards as employed in the present invention.
Figure 2B:
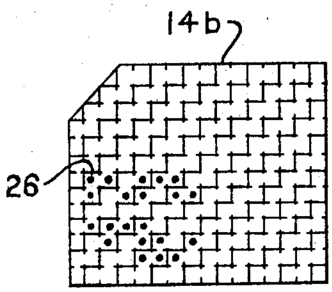
Figure 2C:
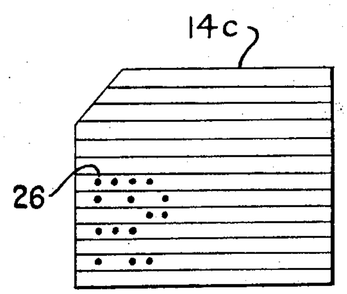

Data may be applied to computer cards in a conventional manner by punching holes in computer cards that are readable by a computer. The present invention provides for color coding of the computer cards. Referring to FIG. 2 there is illustrated three computer cards of different color 14*a*, 14*b* and 14*c*. The first card 14*a* is red, the second card 14*b* is yellow and the third card 14*c* is blue. In accordance herewith data from a location 11, i.e., source documents A is punched upon red cards 14*a* so that the card stack A′ is comprised entirely of red cards. Data from another location 12 appearing on source documents B is punched upon yellow cards 14*b* and data from another location 13 appearing on source documents C is punched upon blue cards 14*c*. No attempt is made in FIG. 2 to accurately depict data that would actually be punched on the cards and the marks or holes 26 shown on the cards are only symbolic of data entered on the cards. It is noted in this respect that information is normally applied to computer cards by punching holes in the cards; however, it is also possible to enter such data by applying marks to the cards. In the present discussion the term "punched card" is taken to mean a computer card having data applied thereto whether by punching or otherwise.

Figure 3:
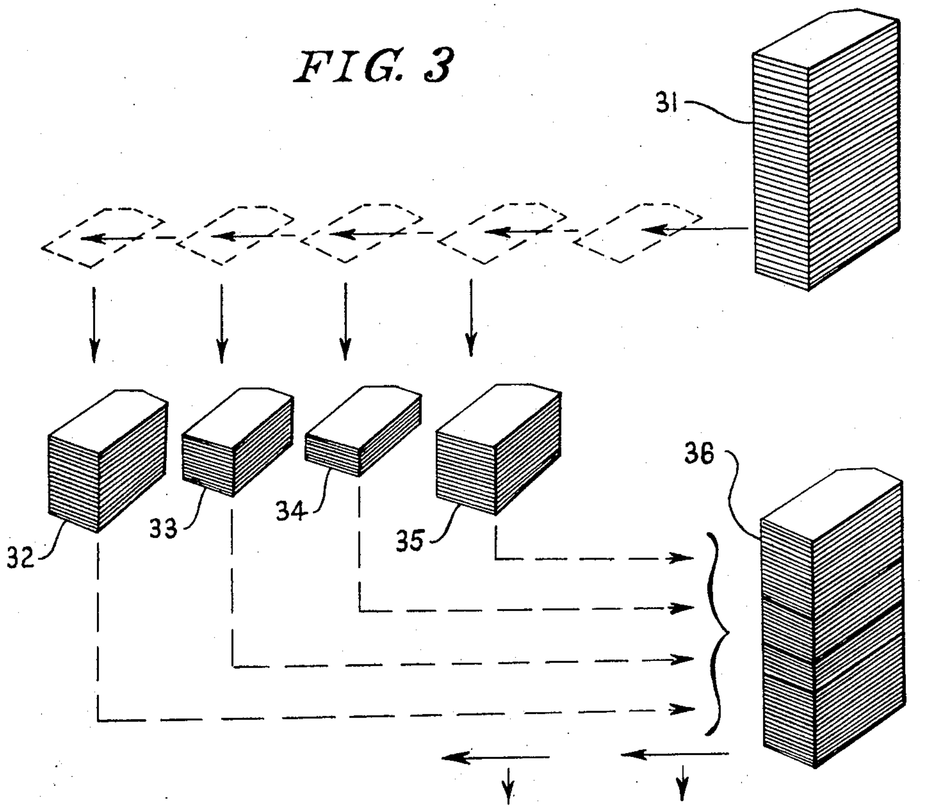
FIG. 3 is a schematic illustration of card sorting in the manipulation of information during computer processing.

Considering further the processing of data in accordance with the present invention and referring to FIG. 3, there will be seen to be schematically illustrated a sorting operation wherein a stack of cards is placed in the hopper of a card sorter. Upon actuation of the sorter, cards are individually removed from the stack 31, read and are sorted into a number of substacks 32 to 35. These substacks are then manually stacked together to form a second stack 36 which is placed in the hopper of the sorter and operated upon again in the manner described above. Multiple sorting operations of the general nature described are normally required in order to arrive at the ultimate desired arrangement of cards in the final stack. These sorting operations require the operator to handle the cards and thus give rise to the opportunity for error. The final stack of cards from the sorter, or card deck as it is commonly termed, will be comprised of different colored cards in a predetermined order as required for subsequent processing of data carried by the cards. Visual observation of the resultant card deck or stack will immediately indicate errors in card arrangement. Suprisingly enough, a stack of cards having a repeating color sequence is readily checked by eye as to any card out of place in the stack. Although it may not seem that it would be possible to observe or visually identify an error in placement of a single card in a stack of a hundred cards, for example, it has been found that such identification is not only possible but is actually quite obvious to an observer. Instructions may be provided to the operator identifying the proper color sequence of cards in a sorted deck and in partially sorted decks or portions thereof. These instructions may take the form of an illustration of colored cards in proper sequence. The operator is thus provided with a standard against which he can compare a deck of cards.

Figure 4:
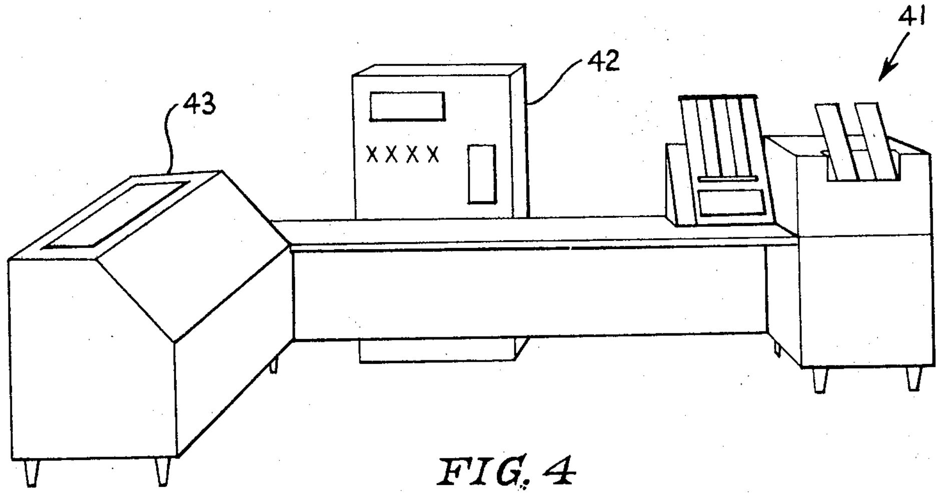
FIG. 4 is a pictorial illustration of equipment that may, for example, be employed in the processing of information in accordance with the present invention.

The sorting operation, briefly described above, may be accomplished in a conventional card sorter as noted, or may be carried out by a sorting mechanism associated with an overall processing unit as indicated in FIG. 4. The equipment illustrated in FIG. 4 includes a card handling unit 41, a computing unit 42 and a printing unit 43. The card handling unit may include functions such as sorting, printing on cards, punching, and the like.

Figure 5:
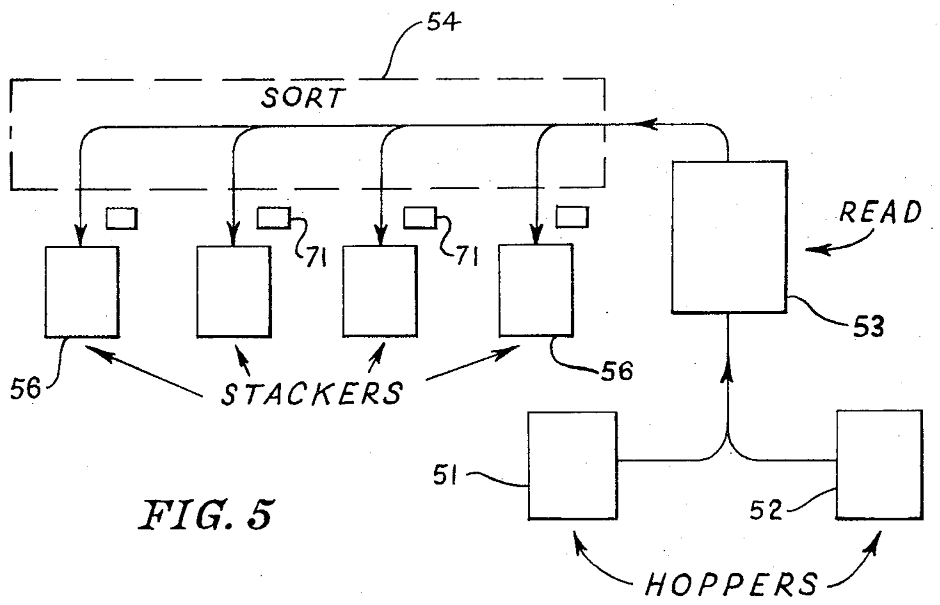
FIG. 5 is a schematic illustration of card reading and sorting as may be incorporated in data processing.
Figure 6:
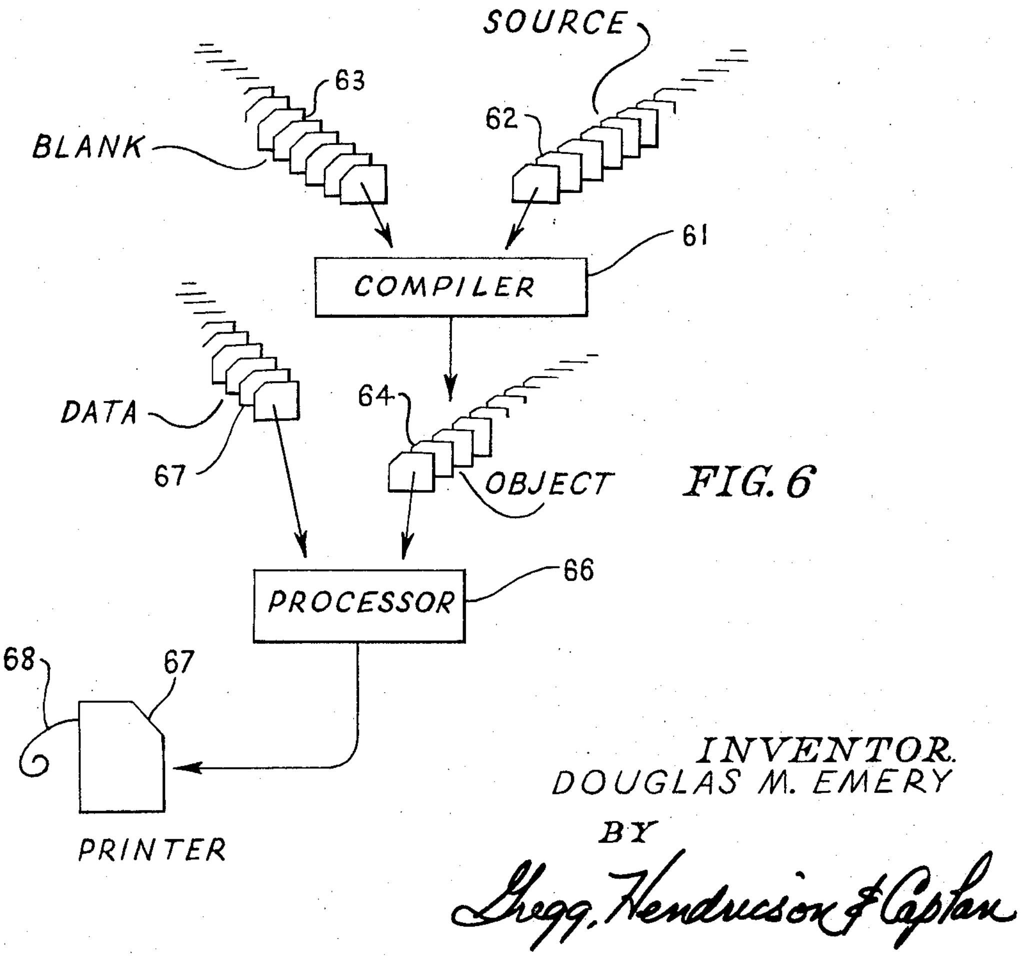
FIG. 6 is a further illustration of certain steps in the processing of data by use of punched cards.

Referring to FIGS. 5 and 6 there is generally indicated certain operations of card handling and arrangement as may be carried out in data processing. At least certain manufacturers produce equipment for operating upon computer cards somewhat in the manner illustrated in FIG. 5. Stacks of cards are placed in hoppers 51 and 52 from whence cards are individually withdrawn and passed through a reader 53 which reads the information on the cards and, in accordance with instructions, operates a sorter 54 applying individual cards to separate stackers 56. This stacking of cards or rearranging of cards may be accomplished at the dictates of a "program" entered upon cards supplied to one of the hoppers. Referring to FIG. 6 this operation is schematically illustrated as the provision to a compiler 61 of blank cards 63 and a source deck 62. The compiler then produces an object program deck 64 upon the blank cards containing information in machine language and including processing instructions. This object program is then applied to a processor 66 together with a data deck 67. The processor 66 operates upon data in accordance with instructions to then produce results such as, for example, an updated inventory list. The output from the processor 66 is applied to a printer 67 producing a written record 68 as the result of the data processing.

The card decks produced for input to data processing systems and as output from such processing are normally stored for subsequent use in further data processing of the same nature. Thus a shoe store, for example, would generate certain card decks containing information relative to transactions or the like of such store and would retain these decks for periodic updating and utilization and generation of such reports as may be required in operation of the business.

At all stages of data processing with computer cards there are steps of manually handling the cards as they are repeatedly sorted and rearranged. For example, after the cards are placed in stackers 56 in accordance with some predetermined instructions, the operator normally removes these cards from the stackers and combines them in a predetermined order for reprocessing by apparatus such as that illustrated. Particular sequences of cards result from each operation and by providing color coding of the cards the operator is then provided with a capability of visually determining errors in card arrangement. Such errors may arise from a variety of sources as indicated above. It is again noted in this respect that an improperly punched card may be improperly located in a deck by sorting mechanisms because of the faulty punching. A slightly bent or otherwise mutilated card may also be improperly sorted and positioned in a deck. Possibly the most common error to occur in handling of cards is the human one wherein an operator inadvertently places a card or a partial stack of cards in the wrong position for sorting or arranging. Unfortunately present day methods of card handling do not normally provide any possibility of determining the existence of an error in the location of one or more cards in a deck until the deck is applied to the processor and processing is attempted.

The present invention does, however, provide for the detection of errors at intermediate stages of card handling and arranging. There may additionally be provided in accordance with the present invention automatic detection means. Thus, for example, in FIG. 5 there is illustrated color sensitive detectors 71 adapted to read the colors of successive cards applied to the different stackers. With a predetermined color sequence of cards to be inserted in the separate stackers, an error in the sequence will then be detected so that the entire operation may then be halted and the error corrected. No attempt is made herein to illustrate details of detection other than to merely note that a sequence of signals corresponding to card colors may be provided for comparison to the sequence of signals actually generated by the detectors to then produce an error signal upon failure of complete coincidence therebetween.

The present invention has been described above in connection with certain illustrative steps in data processing. It is, of course, to be appreciated that the use of different equipment configurations may alter processing steps or the order of steps. It is thus not intended to limit the present invention to the details of description or illustration for it will be apparent that the present invention is applicable to any data processing or card handling wherein a substantial number of computer cards having information thereon are sorted, arranged or in any other manner manipulated. Detection of errors in the arrangement of a plurality of computer cards is possible in accordance with the present invention either by visual observance of card decks by an operator or by the provision of detectors viewing sequencing of cards either as they are stacked or in final stacked deck form. The present invention thus provides an advancement in data processing materially reducing the time and cost thereof.

What is claimed is:

1. A method of data processing comprising the steps of punching data from a first type of source document upon computer cards of a first color, punching data from a second type of source document upon computer cards of a second different color, sorting said cards into predetermined arrangement, and visually checking the order of sorted cards by color sequence of cards.

2. In data processing wherein data from a plurality of sources is applied to computer cards by punching holes in the cards and such cards are sorted by machine in a plurality of sorting operations to form at least one card stack of cards in predetermined order for processing, the improvement comprising applying data from each separate source to cards of different colors with all data from each source being applied to cards of the same color, and visually checking the arrangement of cards during intermediate stages of sorting and at the completion of sorting to verify the proper order of cards in stacks of cards.

3. The method of claim 1 further defined by comparing the color sequence of sorted cards with a color sequence chart to verify the correct order of sorted cards.

4. A method of data processing comprising the steps of applying data to a first series of computer cards of a first color, applying other data to a second series of computer cards of a second color visually distinguishable from said first color, machine sorting of the first and second series of cards to place the cards in at least one deck of cards having a predetermined order of cards in the deck, and visually checking the deck of cards to verify a particular color sequence of cards resulting from said predetermined order of cards.

5. The method of claim 4 further defined by sorting said cards in accordance with the type and kind of data recorded thereon, predetermining the color sequence of sorted cards, and visually checking the deck of cards by comparing said predetermined color sequence with the actual color sequence of cards in the deck to verify proper sorting.

6. The method of claim 4 further defined by applying data from a first type of source document to said first series of cards and applying data from a second type of source document to said second series of cards.

7. The method of claim 4 further defined by also visually verifying the correspondence of the color sequence of a plurality of stacked cards with a predetermined color sequence at intermediate steps of machine sorting to identify errors in sorting and data application prior to completion of sorting.

8. The method of claim 4 further defined by applying program information to a further series of computer cards of a different color from said first and second colors and processing data on the cards of said deck in accordance with said program information.

* * * * *